(12) United States Patent
Gray et al.

(10) Patent No.: US 11,816,885 B1
(45) Date of Patent: Nov. 14, 2023

(54) SYSTEMS AND METHODS FOR ASSESSING PROPERTY DEVELOPMENT CONDITION

(71) Applicant: United Services Automobile Association (USAA), San Antonio, TX (US)

(72) Inventors: Emily Margaret Gray, San Antonio, TX (US); Daniel Christopher Bitsis, Jr., San Antonio, TX (US); Robert Wiseman Simpson, Fair Oaks Ranch, TX (US); Manfred Amann, San Antonio, TX (US); Donnette Moncrief Brown, San Antonio, TX (US); Eric David Schroeder, San Antonio, TX (US); Meredith Beveridge, San Antonio, TX (US); Michael J. Maciolek, Boerne, TX (US); Bobby Lawrence Mohs, San Antonio, TX (US); Brian F. Shipley, Plano, TX (US); Justin Dax Haslam, San Antonio, TX (US); Qunying Kou, San Antonio, TX (US); Ashley Raine Philbrick, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 18/064,606

(22) Filed: Dec. 12, 2022

Related U.S. Application Data

(63) Continuation of application No. 16/828,481, filed on Mar. 24, 2020, now Pat. No. 11,527,061.

(Continued)

(51) Int. Cl.
*G06V 20/10* (2022.01)
*B64C 39/02* (2023.01)
(Continued)

(52) U.S. Cl.
CPC .......... *G06V 20/176* (2022.01); *B64C 39/024* (2013.01); *G05D 1/0027* (2013.01); *G05D 1/0094* (2013.01); *G06Q 50/08* (2013.01); *G06Q 50/163* (2013.01); *G06Q 50/165* (2013.01); *G06T 7/001* (2013.01); *B64U 2101/30* (2023.01); *G06T 2207/10032* (2013.01)

(58) Field of Classification Search
CPC .. G06V 20/176; B64C 39/024; G05D 1/0027; G05D 1/0094; G06Q 50/08; G06Q 50/163; G06Q 50/165; G06T 7/001; G06T 2207/10032; B64U 2101/30
USPC .......................................................... 382/103
See application file for complete search history.

(56) References Cited

U.S. PATENT DOCUMENTS

2020/0057825 A1\* 2/2020 Motahar ................. G06F 30/13

FOREIGN PATENT DOCUMENTS

BR 112021009060-6 \* 5/2020 ............. G06Q 10/06
CN 205422156 U 8/2016
(Continued)

*Primary Examiner* — Jerome Grant, II
(74) *Attorney, Agent, or Firm* — Fletcher Yoder, PC

(57) ABSTRACT

A technique for assessing development condition of a property is provided that determines development condition for an individual property or properties of interest using image or other sensor data from one or more unmanned aerial vehicles taken over the development process. A property condition output may be generated to indicate a condition of the property or properties.

20 Claims, 3 Drawing Sheets

Related U.S. Application Data

(60) Provisional application No. 62/826,314, filed on Mar. 29, 2019.

(51) Int. Cl.
  *G05D 1/00* (2006.01)
  *G06Q 50/08* (2012.01)
  *G06Q 50/16* (2012.01)
  *G06T 7/00* (2017.01)
  *B64U 101/30* (2023.01)

(56) References Cited

FOREIGN PATENT DOCUMENTS

| | | | | |
|---|---|---|---|---|
| CN | 108303703 | * | 7/2018 | ............ G01S 17/08 |
| CN | 109446965 A | | 3/2019 | |
| CN | 111098285 | * | 5/2020 | ............ B25J 5/007 |
| EP | 0467584 A3 | | 10/1992 | |
| JP | 6656446 | * | 3/2020 | ........... G06Q 30/018 |
| KR | 20200076169 | * | 6/2020 | ............ G06F 3/011 |

\* cited by examiner

SYSTEMS AND METHODS FOR ASSESSING PROPERTY DEVELOPMENT CONDITION

CROSS-REFERENCE TO RELATED APPLICATION

This application is a continuation of U.S. non-provisional application Ser. No. 16/828,481, entitled "SYSTEMS AND METHODS FOR ASSESSING PROPERTY DEVELOPMENT CONDITION," filed Mar. 24, 2020, claiming priority to U.S. provisional application No. 62/826,314, entitled "SYSTEMS AND METHODS FOR AS SES SING PROPERTY DEVELOPMENT CONDITION," filed Mar. 29, 2019, which is hereby incorporated by reference in its entirety for all purposes.

BACKGROUND

The present disclosure relates generally to systems and methods for assessing property development. More specifically, the present disclosure relates to techniques to provide an assessment of development stages of a property being developed over the course of construction and to assemble a model of the property based on the assessment, even in the absence of a physical review of the property. The present disclosure also relates to user interfaces that permit a user to review a model of the property based on the assessment.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one example, a system is provided that includes an input interface configured to receive a user input identifying a property in a geographic area. The system also includes a processor configured to receive the user input identifying the property; instruct a controller of an unmanned aerial vehicle to obtain image data of the property via a flight path in the geographic area at a first time point; receive the image data of the property from the unmanned aerial vehicle; determine a development condition of the property at the first time point based on the image data; generate a development condition output; and provide the development condition output to a user via the communication circuitry.

In one example, a method is provided that includes the steps of instructing a controller of one or more unmanned aerial vehicles to obtain image data of a property via a flight path over the property at a plurality of time points, wherein each of the plurality of time points is associated with a respective construction stage of the property; receiving the image data of the property from the one or more unmanned aerial vehicles; and rendering a model of the property based on the image data, wherein the model comprises a plurality of layers, wherein each layer of the plurality of layers is associated with the respective construction stage of the property.

In one example, a system is provided that includes a vehicle fleet of a plurality of unmanned aerial vehicles having respective vehicle controllers. The system also includes a processor configured to communicate with each controller of the vehicle fleet; schedule an individual unmanned aerial vehicle of the vehicle fleet to obtain first image data of a property via a flight path in a geographic area at a first time point, wherein the first time point is based on an estimated construction stage of the property; receive the first image data of the property from the individual unmanned aerial vehicle; determine that the construction stage is complete at the first time point based on the first image data; schedule the individual unmanned aerial vehicle or another individual unmanned aerial vehicle of the vehicle fleet to obtain second image data of the property at a second time point, wherein the second time point is selected on an estimated time to complete a subsequent construction stage of the property; validate completion of the construction stage and the subsequent construction stage based on the first image data and second image data; and provide a validation output to a user based on the validating.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Property development for residential or commercial properties occurs in multiple stages. Such stages may include teardown of a previous structure, clearing of the site, digging and pouring a foundation, framing and/or exterior wall construction, barrier application, utilities, roofing, interior buildouts, exterior cladding, and landscaping. Each stage may involve a separate subcontractor. Monitoring an in-progress property development project to assess construction quality may involve multiple inspections at each stage, which is costly. Further, because construction schedules are unpredictable, it is burdensome to align the schedule of inspectors with the appropriate stages of construction.

Provided herein are tools for evaluating construction conditions during property development that do not require an in-person inspection and that produce models of the property of interest based on data gathered over time. In one embodiment of the disclosed techniques, a user interface is provided that allows users to assess a property at each stage of property development. The present techniques provide rapid and comprehensive property condition analysis.

Figure 1:
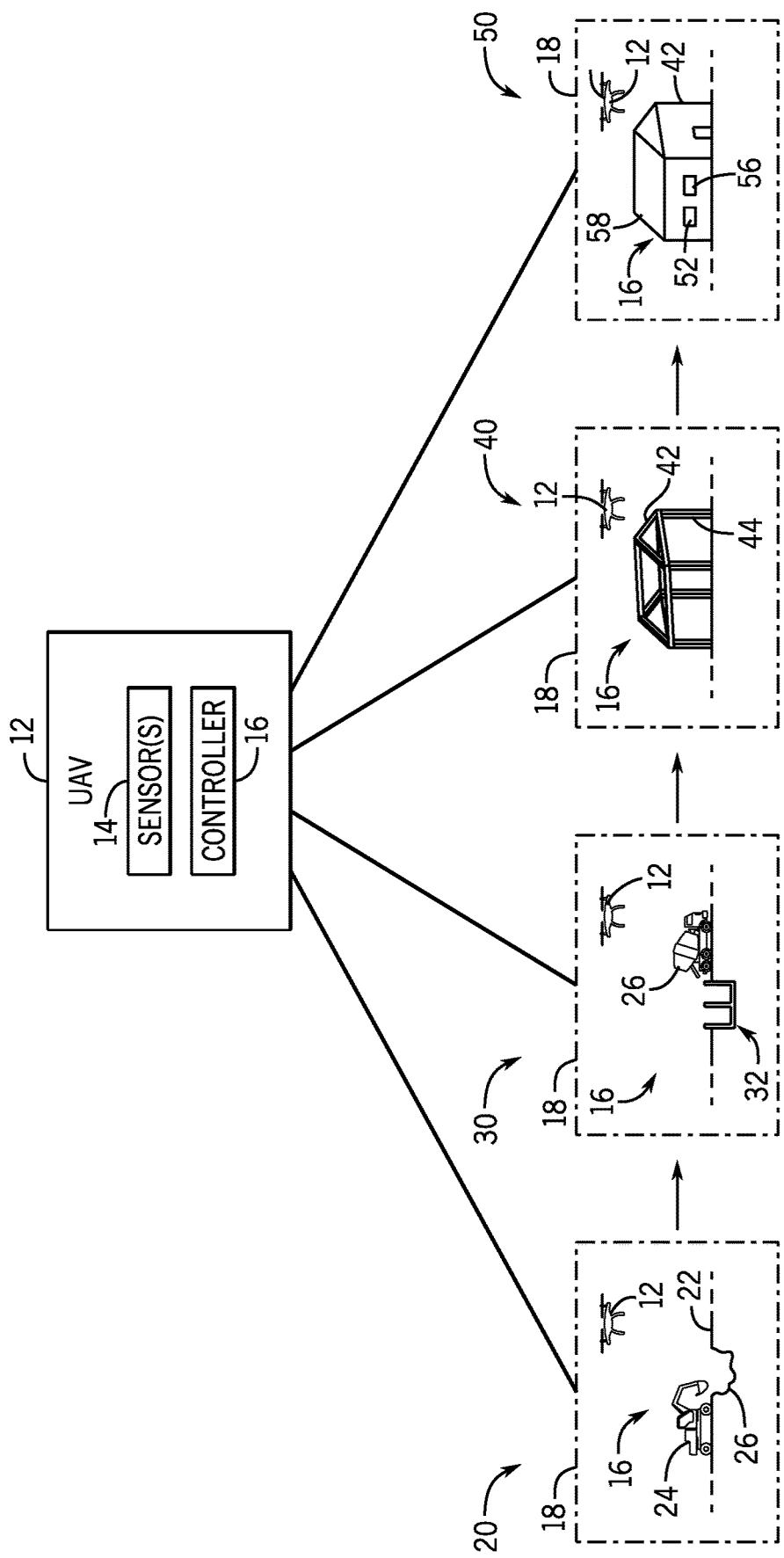
FIG. 1 illustrates a schematic diagram of a property development assessment system, in accordance with embodiments described herein.

FIG. 1 is a schematic diagram of various stages of property development that may be assessed using data acquired from an unmanned aerial vehicle (UAV) 12 carrying one or more on-board sensors 14. Such sensors may include one or more of a camera, an optical sensor, a microphone, a pressure sensor, or a temperature sensor. In operation, the UAV 12, operating under instructions executed by a controller 15, may execute a flight path over a property 16 of interest to acquire the data. The flight path may be bounded by or based on a geographic area 18 in which the property 16 is located. That is, a user input may provide an address or geographic information for the property, and the UAV 12 may execute a flight path based on the geographic information.

Once the property 16 of interest has been identified, the UAV 12 or other UAVs 12 in a fleet may conduct flight paths over the property 16 to monitor development condition. Because construction may occur as a series of ordered stages (e.g., foundation work is typically initiated before framing work), the present techniques permit monitoring of development condition of the property 16 according to a desired progression or timeline. In one embodiment, identification of the property 16 may trigger scheduling of UAV flights over the property to identify that the each stage, e.g., the foundation stage, has begun according to a preset timeline. It should be understood that the disclosed stages of property development are by way of example, and additional or different stages may be appropriate depending on the individual property 16 of interest. For example, a new construction project may have different stages relative to a rehabilitation or remodeling project. Further, in certain embodiments, it may be desired to monitor individual substages (e.g., plumbing, electrical) of the disclosed construction stages. The individual property 16 may be a residential property (e.g., standalone single family homes, condominium units, townhomes, multifamily dwellings, etc.) and/or may be a commercial property.

In one example, at an initial stage of development, the UAV may execute a flight path over the property 16, in this case a construction site at an initial construction stage 20, to determine if ground has been broken to indicate that the property development may be considered to be in an initial stage or broken ground stage (shown as stage 20). For example, image data from the sensor 14 of the property 16 may be assessed to identify signs of the initial construction stage 20, such as a cleared site 22, presence of construction vehicles 24, and digging work 26. Such features may be identified using pattern matching, using raw or processed image data, (e.g., using a trained neural network) to match image features with known features characteristic of the initial stage 20 from similar properties. In a specific embodiment, an image of the property 16 showing an absence of trees (e.g., as identified by the neural network using a set of training images) may be indicative of the cleared site 22. Further, the image data acquired by the sensor 14 may be compared to a baseline image of the property 16, taken at the time of property acquisition or at a time point before property development to identify changes relative to the baseline image.

Additional stages of property development may be identified via characteristic image or other data acquired by the UAV 12. For example, a foundation stage 30 may be identified through foundation features 32 (poured concrete, presence of a concrete mixer 26). A rough framing stage 40 may be identified through the presence of a raised structure 42 and individual framing components 44. A finishing stage 50 may be identified through the presence of features of the raised structure 42 such as windows 52, exterior walls 56, and roof components 58.

As provided herein, the UAV 12 may acquire image data indicative of various stages of property development. In addition or in the alternative, the UAV 12 may acquire data such as sound data indicative of the presence of an active construction crew as part of identification of property development stages. Further, the UAV 12 may also acquire local weather condition data as input to the property condition. For example, an extended period of rainy or freezing weather may result in adjustments to an established property development timeline.

Provided herein are techniques for assessing property development using data acquired from one or more UAVs. The UAVs may be part of a fleet of UAVs that are individual controlled to acquire property data for one or more properties of interest. Also provided herein is a system 100 for assessing property development condition (i.e., a property development condition assessment system) based on UAV-acquired data, as generally disclosed in FIG. 2.

Figure 2:
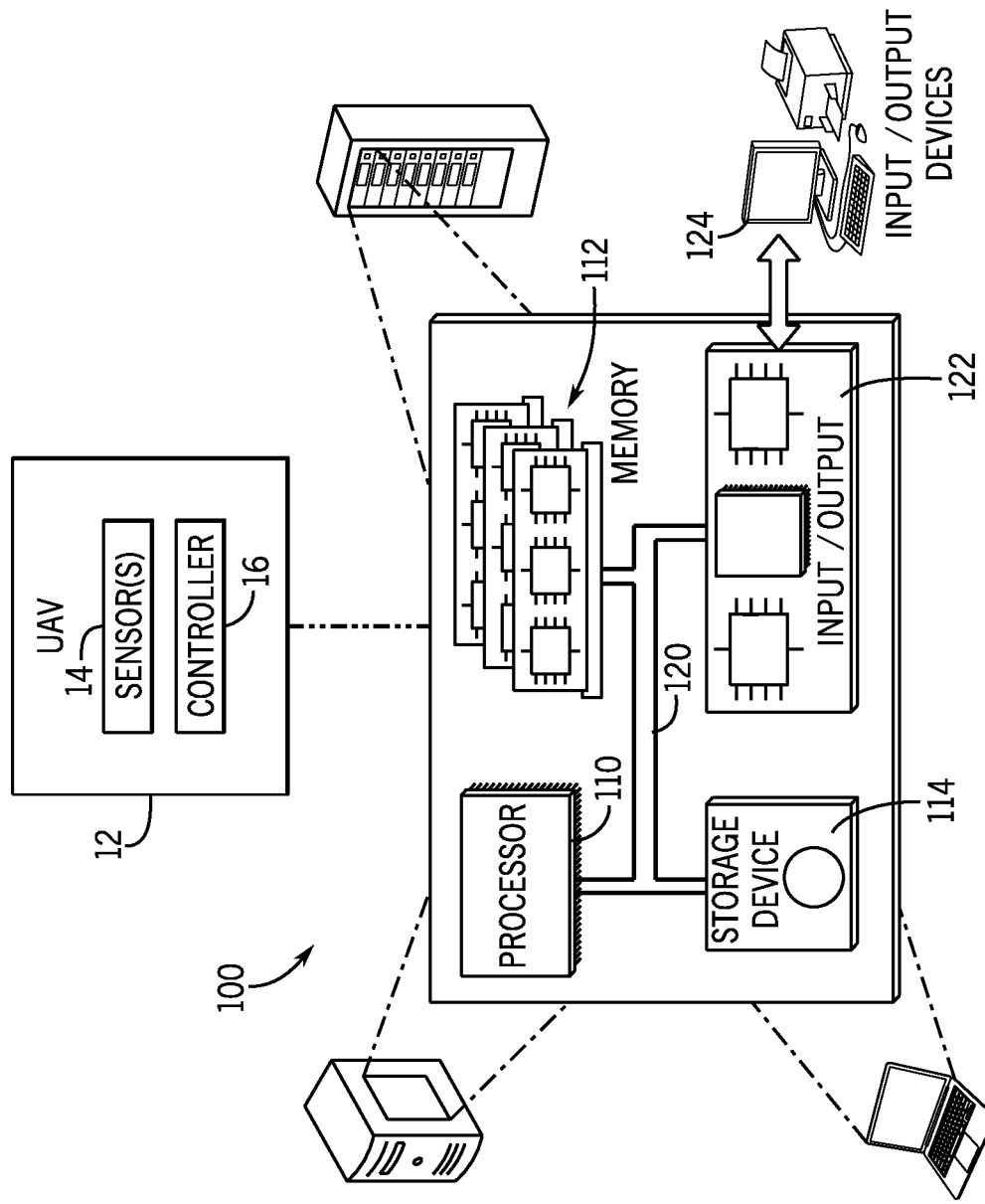
FIG. 2 illustrates a block diagram of a computing system that may be used in conjunction with the system of FIG. 1, in accordance with embodiments described herein.

FIG. 2 depicts an example property development condition assessment system 100, according to implementations of the present disclosure. The system 100 may be used for one or more of the operations described with respect to the various implementations discussed herein. The system 100 may include one or more processors 110, a memory 112, one or more storage devices 114, and one or more input/output (I/O) devices 122 controllable through one or more I/O interfaces 124. The various components 110, 112, 114, 122, or 124 may be interconnected through at least one system bus 120, which may enable the transfer of data between the various modules and components of the system 100. Alternatively or additionally, one or more components 110, 112, 114, 122, or 124 may be located remotely from one another and coupled through one or more wired or wireless connections. For example, at least part of the processing may be accomplished using cloud-based processors 110.

The processor(s) 110 may be configured to process instructions for execution within the system 100. The processor(s) 110 may include single-threaded processor(s), multi-threaded processor(s), or both. The processor(s) 110 may be configured to process instructions stored in the memory 112 or on the storage device(s) 114. The processor(s) 110 may include hardware-based processor(s) each including one or more cores. The processor(s) 110 may include general purpose processor(s), special purpose processor(s), or both.

The memory 112 may store information within the system 100. In some implementations, the memory 112 includes one or more computer-readable media. The memory 112 may include any suitable number of volatile memory units and/or non-volatile memory units. The memory 112 may include read-only memory, random access memory, or both. In some examples, the memory 112 may be employed as active or physical memory by one or more executing software modules.

The storage device(s) 114 may be configured to provide (e.g., persistent) mass storage for the system 100. In some implementations, the storage device(s) 114 may include one or more computer-readable media. For example, the storage device(s) 114 may include a floppy disk device, a hard disk device, an optical disk device, or a tape device. The storage device(s) 114 may include read-only memory, random access memory, or both. The storage device(s) 114 may include one or more of an internal hard drive, an external hard drive, or a removable drive.

One or both of the memory 112 or the storage device(s) 114 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 100. In some implementations, the CRSM may include a data store that provides storage of computer-readable instructions or other information in a non-transitory format. The CRSM may be incorporated into the system 100 or may be external with respect to the system 100. The CRSM may include read-only memory, random access memory, or both. One or more CRSM suitable for tangibly embodying computer program instructions and data may include any suitable type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 110 and the memory 112 may be supplemented by, or incorporated into, one or more application-specific integrated circuits (ASICs).

The system 100 may include one or more I/O devices 124. The I/O device(s) 124 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 124 may also include one or more output devices such as a display, LED(s), an audio output device (e.g., a speaker), a printer, a haptic output device, and so forth. The I/O device(s) 124 may be physically incorporated in one or more computing devices of the system 100, or may be external with respect to one or more computing devices of the system 100.

The system 100 may include one or more I/O interfaces 122 to enable components or modules of the system 100 to control, interface with, or otherwise communicate with the I/O device(s) 950. The I/O interface(s) 122 may enable information to be transferred in or out of the system 100, or between components of the system 100, through serial communication, parallel communication, or other types of communication. For example, the I/O interface(s) 122 may comply with a version of the RS-232 standard for serial ports, or with a version of the IEEE 1284 standard for parallel ports. As another example, the I/O interface(s) 122 may be configured to provide a connection over Universal Serial Bus (USB) or Ethernet. In some examples, the I/O interface(s) 122 may be configured to provide a serial connection that is compliant with a version of the IEEE 1394 standard.

The I/O interface(s) 122 may also include one or more network interfaces that enable communications between computing devices in the system 100, and/or between the system 100 and other network-connected computing systems. The network interface(s) may include one or more network interface controllers (NICs) or other types of transceiver devices configured to send and receive communications over one or more networks using any suitable network protocol.

Computing devices of the system 100 may communicate with one another, or with other computing devices, using one or more networks. Such networks may include public networks such as the internet, private networks such as an institutional or personal intranet, or any combination of private and public networks. The networks may include any suitable type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 100 may include one or more computing devices of any suitable type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and/or processor(s) of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Included in the system is a user device 124 from which the initial query regarding property development condition is generated. The user device may be a general-purpose personal computer, a laptop computer, a tablet computer, a mobile computer, a mobile device (e.g., cell phone), etc. The system 100 may be in communication with the user device 124 and configured to receive the initial query via the interface 122.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

It should be noted that the components described above with regard to the property development condition assessment system 100 are exemplary components and the system 100 may include additional or fewer components as shown.

The system 100 may communicate with one or more UAVs 12 that acquire property data (e.g., image data). In certain embodiments, the system 100 communicates with a UAV control system that in turn provides instructions to one or more UAVs 12. Such communication may include property information that causes one or more UAVs 12 to execute a flight path over the property 16 under control of the controller 15. The controller 15 may also activate the one or more sensors 14 to acquire property data based on the location of the UAV 12 (e.g., when positioned over the property 16). In one embodiment, the UAV 12 performs a series of scheduled flight paths (e.g., daily, weekly) and provides the acquired property data to the system 100 for analysis of property condition. In another embodiment, the UAV 12 acquires general data of a particular geographic area and, upon receipt of property information, provides historic data of the property to the system 100.

Figure 3:
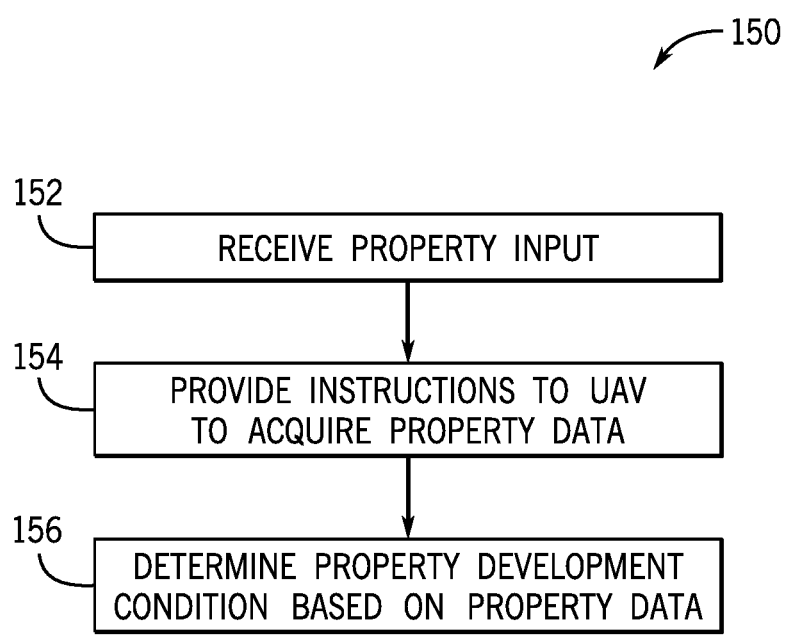
FIG. 3 illustrates a flow diagram for assessing a property development in accordance with embodiments described herein.

FIG. 3 depicts a flow diagram of an example process 150 for monitoring development of a property 16, according to implementations of the present disclosure. At block 152, the system 100 may receive information relating to the property 16 of interest. Once identified, the system may provide instructions to the UAV 12 to execute a flight path over the property 16 to acquire property data at block 154. As described above, the property data may include image data acquired at one or more time points (e.g., a first time point, a second time point). The image data may be received at the system 100. The system 100 may in turn assess the property data to determine a property development condition at block 156.

For example, the system 100 may assess the property data determine whether the property development condition is indicative of a potential construction error or defect. In one embodiment, identifying a construction error is determined in part by determining that too much time has passed between different identified construction phases. For example, if more than a predetermined amount of time has passed between identification of the initial stage 20 and the foundation stage 30, the property development may be associated with a potential error. Further, the system 100 may also pull in weather condition data as part of the assessment. If a period of extended rain occurs during a finishing stage 50, the images may be assessed to identify if protective barrier was present on the walls 56 of the raised structure 42. If no protective barrier is present in conjunction with the presence of rain, the construction error may be determined. In another example, the weather data may trigger a notification that certain portions of the property 16 should be covered, e.g., that a foundation should be covered to prevent water seepage. A UAV 12 may be scheduled to confirm compliance with the notification based on acquired image data. Failure to comply may be associated with penalties or additional alerts.

In another embodiment, a property 16 may be assessed to be free of potential construction errors, or may be assessed as passing based on an analysis of the system 100 to provide a validation output. For example, if progression between stages occurs within predetermined time thresholds, the property 16 may pass the assessment. Each stage may be associated with different time thresholds. For example, foundation work may have a different estimated time to completion than framing or roofing stages. The foundation stage estimated time to completion may be selected based on an estimated curing time of concrete. Further, the estimated curing time before the foundation stage is complete may be determined or adjusted by the system 100 based on acquired image data of the foundation stage. In one example, the estimation is determined by extracting the regions of the image having concrete and estimating a total volume of concrete based on the extracted regions and, optionally, estimated topology or depth in the image. If subsequent image data is acquired that indicated a next stage has initiated before the estimated curing time as determined by the system 100, an alarm or notification may be output to the user. The estimated curing time may further be adjusted based on weather information. If average humidity or rainfall during the foundation stage is above a threshold, the estimated curing time may be adjusted upward (i.e., longer curing time than if humidity and/or rainfall were below the threshold or longer than a benchmark). Further, an identified type of construction, based on the image data, may be used to set the threshold. If an exterior property material, per the image data, is indicative of brick exterior, the time threshold for exterior work may be extended relative to siding or tilt wall construction. In another example, an estimated construction material, as determined in the image data, may be used to initiate additional associated stages for that material. For example, brick work may be associated with a pointing stage that is automatically populated when brick is identified in the image data. On the other hand, certain types of exterior brick are assembled as brick veneer layers, and the system may distinguish between brick and brick veneer. Further, the predetermined time thresholds between subsequent stages may be used to schedule a next data gathering flight path of the UAV 12 (e.g., any individual UAV 12 available if part of a fleet). The various development indicators may be provided to a user of the system 100, e.g., may be displayed on a display, and/or may be provided as alerts. For example, an owner of the property 16 may receive an alert regarding potential construction errors.

The present techniques may include acquisition of property data over a course of property development. The acquired image data may be used to assembly a computer model of the property in which each of the construction stages is rendered as a layer of the model. Construction layers may be peeled away so that the user can view the framing stage to identify locations of load-bearing elements, for example, or interior rooms. The layers may be peeled away to the initial site clearing, the foundation, the plumbing stage, drywall, etc. The model may be assembled from the image data acquired from the various construction stages, and the layers may be divided by time point or construction stage. In one example, a layer may be a layer built using a last image acquired during a particular construction stage or using a composite image from multiple timepoints during the construction stage. In another example, a layer may include several sublayers from the various images acquired over time so that a user may view progress of the stage.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
communication circuitry configured to communicate with a controller of an unmanned aerial vehicle; and
a processor configured to:
receive first image data of a property;
identify a construction stage of the property based on the first image data;
receive weather data corresponding to a time period during the construction stage;
determine a development condition of the property based on the weather data and on a presence or absence of a construction feature of the first image data;
determine an estimated time to complete the construction stage of the property based on the development condition; and instruct the controller of the unmanned aerial vehicle to obtain second image data based on the estimated time to complete the construction stage of the property.

2. The system of claim 1, wherein the processor is configured to instruct the controller of the unmanned aerial vehicle or an additional unmanned aerial vehicle to obtain the first image data of the property via a flight path.

3. The system of claim 1, wherein the construction feature comprises a structural foundation feature.

4. The system of claim 1, wherein the construction feature comprises a protective barrier.

5. The system of claim 1, comprising the unmanned aerial vehicle.

6. The system of claim 1, wherein the construction feature is concrete, and wherein the estimated time corresponds to a total curing time of the concrete.

7. The system of claim 1, wherein the weather data indicates an occurrence of a rain during the estimated time to complete the construction stage.

8. The system of claim 1, wherein the processor is configured to instruct the unmanned aerial vehicle to obtain the second image data after the estimated time elapses.

9. The system of claim 1, wherein the processor is configured to:
  determine a subsequent construction stage based on the first image data and the second image data;
  generate a development condition output based on the subsequent construction stage; and
  output the development condition output to a computing device.

10. A method, comprising:
  instructing an unmanned aerial vehicle to obtain image data of a property;
  receiving the image data of the property from the unmanned aerial vehicle;
  identifying a construction stage of the property based on the image data;
  receiving weather data corresponding to a time period during the construction stage;
  determining a development condition of the property based on the weather data and on a presence or absence of a construction feature of the image data;
  determining an estimated time to complete the construction stage of the property based on the development condition;
  generating a development condition output based on the estimated time to complete the construction stage of the property; and
  outputting the development condition output to a computing device.

11. The method of claim 10, comprising determining that the estimated time to complete the construction stage exceeds a threshold time; and
  outputting the development condition output based on the estimated time exceeding the threshold time.

12. The method of claim 10, comprising scheduling the unmanned aerial vehicle or an additional unmanned aerial vehicle to obtain additional image data of the property based on the estimated time to complete the construction stage of the property.

13. The method of claim 10, comprising rendering a property model based on the estimated time to complete the construction stage of the property.

14. The method of claim 10, wherein the construction feature is concrete, and wherein the estimated time corresponds to a total curing time of the concrete.

15. A tangible, non-transitory, machine-readable medium, comprising machine-readable instructions that, when executed by one or more processors, cause the one or more processors to perform operations comprising:
  receiving first image data of a property;
  identifying a construction stage of the property based on the first image data;
  receiving weather data corresponding to a time period during the construction stage;
  determining a development condition of the property based on the weather data and on a presence or absence of a construction feature of the first image data;
  determining an estimated time to complete the construction stage of the property based on the development condition;
  scheduling an unmanned aerial vehicle to obtain second image data of the property based on the estimated time to complete the construction stage of the property; and
  instructing the unmanned aerial vehicle to obtain the second image data in accordance with the estimated time.

16. The tangible, non-transitory, machine-readable medium of claim 15, wherein the instructions, when executed by the one or more processors, cause the one or more processors to perform operations comprising generating a model of the property based on the first image data and the second image data.

17. The tangible, non-transitory, machine-readable medium of claim 15, wherein the instructions, when executed by the one or more processors, cause the one or more processors to perform operations comprising:
  determining a construction defect corresponding to the property based on the first image data and the second image data.

18. The tangible, non-transitory, machine-readable medium of claim 17, wherein the instructions, when executed by the one or more processors, cause the one or more processors to determine the construction defect comprises:
  identifying an additional construction feature in the second image data, wherein the additional constructional feature indicates a subsequent construction stage of the property.

19. The tangible, non-transitory, machine-readable medium of claim 15, wherein the construction feature comprises a structural foundation feature.

20. The tangible, non-transitory, machine-readable medium of claim 15, wherein the weather data comprises an average humidity, an amount of rainfall, or both, and wherein the received weather data causes the estimated time to complete the construction stage to be adjusted upwards when the average humidity exceeds a humidity threshold, the amount of rainfall exceeds a rainfall amount threshold, or both.

* * * * *